(No Model.) 2 Sheets—Sheet 1.
G. M. WILLIAMS.
LAWN MOWER.
No. 359,550. Patented Mar. 15, 1887.
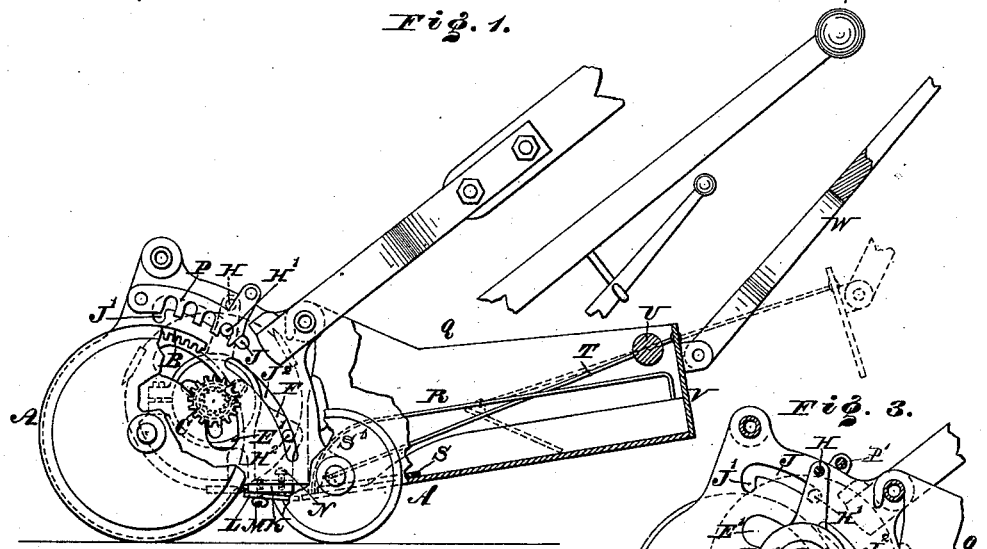
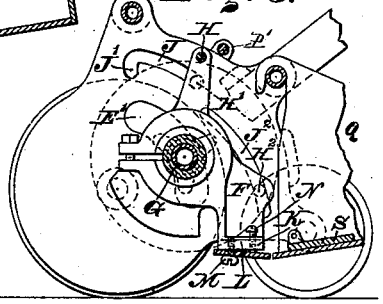
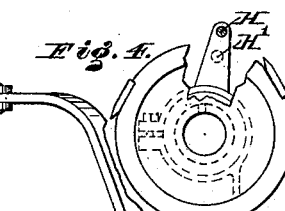
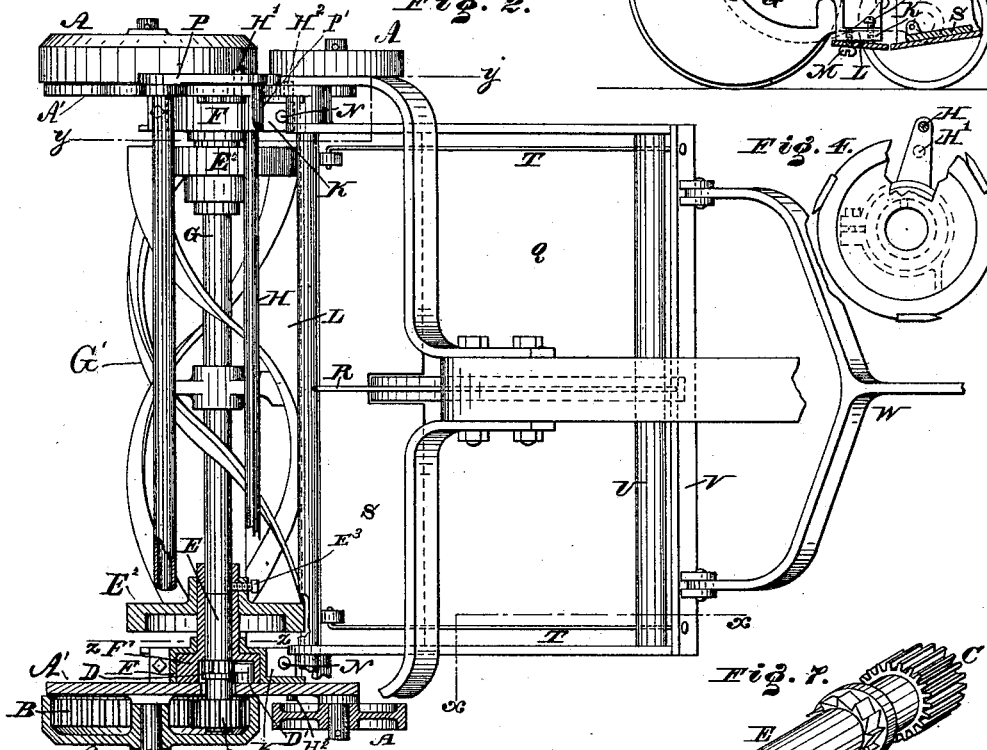
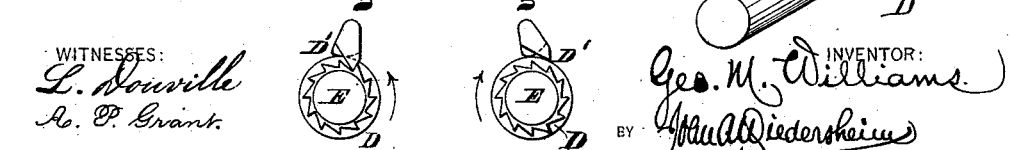
WITNESSES: L. Douville, A. P. Grant.
INVENTOR: Geo. M. Williams
BY John A. Wiedersheim
ATTORNEY.

(No Model.) 2 Sheets—Sheet 2.

G. M. WILLIAMS.
LAWN MOWER.

No. 359,550. Patented Mar. 15, 1887.

Attest:
Court A. Cooper
Robert Aiton

Geo. M. Williams
Inventor
by John A. Wiedersheim
Attorney

N. PETERS, Photo-Lithographer, Washington, D. C.

United States Patent Office.

GEORGE M. WILLIAMS, OF NEWARK, DELAWARE, ASSIGNOR TO THE W. L. NASSAU MANUFACTURING COMPANY, OF SAME PLACE.

LAWN-MOWER.

SPECIFICATION forming part of Letters Patent No. 359,550, dated March 15, 1887.

Application filed May 12, 1886. Serial No. 201,897. (No model.)

*To all whom it may concern:*

Be it known that I, GEORGE M. WILLIAMS, a citizen of the United States, residing at Newark, in the county of New Castle, State of Delaware, have invented a new and useful Improvement in Lawn-Mowers, which improvement is fully set forth in the following specification and accompanying drawings, in which—

Figure 8:
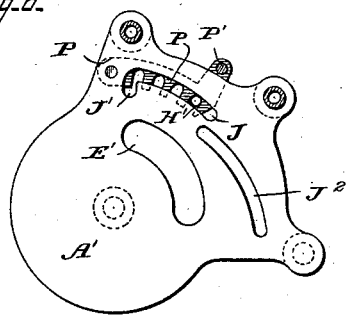
Figure 9:
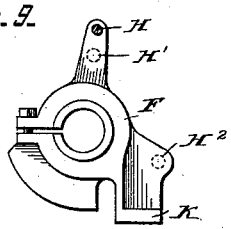
Figure 10:
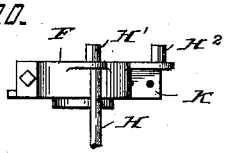
Figure 11:
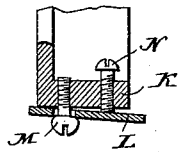

Figure 1 represents a partial side elevation and partial vertical section in line $xx$, Fig. 2, of a lawn-mower embodying my invention. Fig. 2 represents a partial top view and partial horizontal section thereof. Fig. 3 represents a vertical section of a detached part in line $yy$, Fig. 2. Fig. 4 represents a vertical section of a detached portion in line $zz$, Fig. 2. Figs. 5, 6, and 7 represent views of the pawl-and-ratchet mechanism employed. Fig. 8 represents a view of a portion of a frame thereof, showing slots therein, also a segmental rack pivoted to said frame. Fig. 9 represents a side view of another frame thereof. Fig. 10 represents a plan view of the frame, Fig. 9. Fig. 11 represents an enlarged view of the ledger-blade with opening and the fastening-bolt with rounded head.

Similar letters of reference indicate corresponding parts in the several figures.

My invention consists of a lawn-mower having an adjustable bed-knife, as will be hereinafter fully set forth.

It also consists of means for vertically adjusting the cutting mechanism and connected parts.

It also consists of a novel grass receiver or holder.

Referring to the drawings, A represents the wheels of a lawn-mower, the same being secured to the frame side plates, A'. Each of the front pair of said wheels has an internal rack or gear, B, with which meshes the pinion C of the shaft E. The shaft G of the rotary cutter is connected to the shaft E by means of the sleeve F', which latter is secured to the shaft G, embracing the end of the same and a portion of the shaft E, which latter shaft is provided with a ratchet, D, the inner wall of the sleeve F' having a pawl, D', operating therewith, whereby the said shaft G may have motion with said shaft E when the machine is moved forward, or the shaft E may revolve without the shaft G when the machine is moved backward. $E^2$ represents disks suitably fastened to said sleeve F' and shaft G by means of screws $E^3$, and to which are secured the reel G'. The sleeves F' are suitably journaled in castings or pieces F, which are on the inner side of and adjacent to the said frame side plates, A', and the shafts E pass freely through segmental slots in the said plate, A', of the mower, and are raised or lowered with said castings F and connected parts. The said castings F are connected by a brace-rod, H, and have outwardly-projecting lugs H', which enter segmental slots J in the frame of the mower, the upper ends of said slots J terminating in recesses J', adapted to receive the ends of the lugs H' when raised to full extent. Lugs $H^2$ also project from the castings F, and enter segmental slots $J^2$ in the frame of the mower, the castings F and the brace-rods H forming the frame of the cutting mechanism, which frame is guided in its rising and lowering motions by the lugs H' $H^2$.

The lower portions of the castings F have rearward projecting lugs K, to which the bed-knife or ledger-blade L is secured, the connection of the said blade with the lugs K being by means of bolts M, which are passed through the blade and lugs from below the bolt, passing freely through the blade L. The heads of the bolts M are rounded on their inner side or sides contiguous to the ledger-blade L, so that the latter may roll on their rounded heads during the operation of adjustment. In order to set the knife or adjust the angle thereof, I employ screws or studs N, which are fitted to the lugs and have their points bearing against the upper face of the blade, so that by the proper rotation of said studs N in said lugs K the distance of the back edge of the blade from the lug K may be fixed, so that when the bolts M are tightened and the blade is brought against the end of the studs N and the front edge of the lug K the adjustment thereof is effected.

The rotary cutter and ledger-blade may be raised together, owing to the castings F, which form the bearings for the former and supports of the latter, it being noticed that in the elevation of said parts the shafts E of the pawl-and-ratchet mechanism move through the slots E', and the pinions C move with said shafts. The ends of the lugs H' move through the segmental slots, and may be dropped into the recesses J', thus holding the parts in elevated position. Said parts may, however, be held at a height intermediate of the ends of the slots E' by means of segmental racks P, which are pivoted to the outer sides of the frame of the mower, and are connected by the horizontal cross-bar P', the teeth being adapted to engage with the ends of the lugs H' and sustain them, and consequently the parts connected therewith. When the racks are moved clear of the projecting ends of the lugs H', the cutting mechanism may be lowered to full extent.

Q represents a grass receiver, consisting of a box connected to the rear of the frame of the mower, and having a central guide-rod, R, against which bears a clearer or scraper, S, said guide-rod being bent downward at its forward end, as shown at S'.

Pivoted to the clearer S are rods T, which are guided in a cross-bar, U, which is attached to the sides of the box, said rods being connected with the rear side, V, of the box, the latter being provided with a handle, W, and adapted to be moved backward so as to uncover the end of the box, said handle being sustained on the handle of the mower.

It will be seen that when the grass is cut by the mower it is directed into the box, and when the latter is sufficiently full the handle W is drawn rearward, whereby the side V moves with it, and the clearer S rises, owing to the shape of the guide R, and follows the side V, so that the grass is pushed through the box and dumped at the rear of the same, which is open, owing to the movement of the side V of the same with the handle W. (See dotted lines, Fig. 1.) The handle is then pushed forward, so that the side returns to its normal position, closing the rear of the box, and the clearer or scraper is lowered onto the bottom of the box, owing to the bend S' of the guide-rod, whereby the box may again be filled with cut grass, ready to be cleared of the same when the handle is again operated, in the manner hereinbefore stated.

Having thus described my invention, what I claim as new, and desire to secure by Letters Patent, is—

1. A lawn-mower having the frame side plates, A', provided with slots E' and J, the shaft E, and the castings F on the inner side of and adjacent to the frame side plates, A', and having lugs H', the said shaft E and lugs H' entering into said slots E' and J, respectively, as and for the purpose described.

2. A lawn-mower having the side plates of its frame provided with slots, castings adjacent to said frame, forming bearings for the shaft of a pinion internally meshing with one of the running wheels of the mower, said casting having lugs adapted to move in said slots, and a cutting device connected to said castings, all substantially as and for the purpose set forth.

3. A lawn-mower having the castings F on the inner sides of the frame side plates and forming bearings for the rotary cutter, and provided with a cutting device connected to said castings, the said castings having a brace-rod connecting the same, all substantially as and for the purpose set forth.

4. A lawn-mower having the castings F, with lugs H', and the frame side plates, A', with slots J, formed with recesses J', the said castings being on the inner side and adjacent to said frame side plates, whereby the said castings, forming a bearing for the cutting mechanism, may be adjusted, substantially as described.

5. A lawn-mower having the frame side plates, A', with slots J, and the castings F, having bearings for the rotary cutter, the said castings being adjacent to and on the inner sides of said frame side plates, and provided with the lugs H', and the pivoted rack P, with cross-bar P', all substantially as and for the purpose set forth.

6. In a lawn-mower, the castings F, mounted on the shaft E and adjacent to the frame side plates, A', and having lugs K, in combination with ledger-blade L, the studs N, adjustable in lugs K and bearing against the blade L, and the screw-bolts M, passing through the blade L and lugs K, and having the portion of their heads adjacent to blade L rounded, all substantially as described.

7. In a lawn-mower, in combination with the ledger-blade and its adjusting device, a clamping device having a bolt with the portion of its head adjacent to the ledger-blade rounded, whereby a rolling motion of the blade is permitted during adjustment, all substantially as described.

8. In a lawn-mower, a grass-receiver consisting of a box, a guide-rod, a scraper, rods connected to the scraper and to a movable side of the box, and a handle attached to said side, said box being adapted to be connected to the rear of the frame of a mower, all substantially as described.

9. A grass-receiver having a box connected to the rear of the frame of a mower, provided with a scraper, rods pivoted to said scraper and secured to a movable side of said box, and a handle secured to said side, all substantially as described.

10. A grass-receiver having a box with the cross-bar U, the bent guide-rod R, the scraper S, with rods T pivotally secured thereto and guided in said cross-bar U, the movable side V, to which are secured rods T, and handle W, all of said parts being combined and operating substantially as described.

GEORGE M. WILLIAMS.

Witnesses:
JOHN A. WIEDERSHEIM,
A. P. GRANT.